US006385191B1

(12) United States Patent
Coffman et al.

(10) Patent No.: US 6,385,191 B1
(45) Date of Patent: May 7, 2002

(54) EXTENDING INTERNET CALLS TO A TELEPHONY CALL CENTER

(75) Inventors: James E. Coffman, Boulder; Kurt H. Haserodt, Westminster, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/749,298

(22) Filed: Nov. 14, 1996

(51) Int. Cl.[7] .............................................. H04L 12/66
(52) U.S. Cl. ....................................... 370/352; 370/401
(58) Field of Search ................................. 370/352, 353, 370/354, 355, 356, 392, 401, 402, 403, 404, 405, 410; 379/93.23, 201, 219, 88.17, 201.01, 220.01

(56) References Cited

U.S. PATENT DOCUMENTS

| | | | | | |
|---|---|---|---|---|---|
| 5,724,412 | A | * | 3/1998 | Srinivasan | 379/93.23 |
| 5,764,736 | A | * | 6/1998 | Shachar et al. | 379/93.09 |
| 5,768,513 | A | * | 6/1998 | Kuthyar et al. | 395/200.34 |
| 5,809,128 | A | * | 9/1998 | McMullin | 379/215 |
| 5,838,665 | A | * | 11/1998 | Kahn et al. | 370/260 |
| 5,848,143 | A | * | 12/1998 | Andrews et al. | 379/219 |
| 5,850,433 | A | * | 12/1998 | Rondeau | 379/201 |
| 5,862,134 | A | * | 1/1999 | Deng | 370/352 |
| 5,884,032 | A | * | 3/1999 | Bateman et al. | 709/204 |
| 5,907,547 | A | * | 5/1999 | Foladare et al. | 370/352 |
| 5,915,001 | A | * | 6/1999 | Uppaluru | 379/88.22 |
| 6,130,933 | A | * | 10/2000 | Miloslavsky | 379/90.01 |

FOREIGN PATENT DOCUMENTS

| | | | |
|---|---|---|---|
| CA | 2239493 | 6/1997 | H04L/12/66 |
| CA | 2211908 | 7/1997 | H04L/12/12 |

OTHER PUBLICATIONS

Phillips Business Information, Inc., New Products Add Interactive Voice–Response to Web Sites, Interactive Marketing News, Mar. 15, 1996, vol. 3, No. 6, ISSN: 1078–6821, DialogWeb Command Mode, http://www.dialogweb.com/cgi/dwclient.

(List continued on next page.)

Primary Examiner—Kwang B. Yao
(74) Attorney, Agent, or Firm—David Volejnicek

(57) ABSTRACT

A call originating in the Internet network (102) is converted by a gateway (104) into a telephone call and is completed to a call center (106) as a conventional inbound call including caller identification. An Internet user who has accessed a World Wide Web (WWW) home page (114) of a call center customer indicates a desire to speak to a call center agent by activating a "call" virtual button (115) of the home page by means of the WWW browser (101) of the user's Internet phone (99)-equipped client (100). The WWW server (103) of the home page responds by sending an executable applet (117) and the call center's telephone number (116) to the client (100). The client executes the applet to obtain the user's telephone number from the user, to establish an Internet connection between the Internet phone (99) and the gateway, and to provide the user's and call center's telephone numbers to the gateway. The gateway uses the phone numbers to establish a call to the call center through the telephone network (105). It provides the user's telephone number to the call center as the calling telephone number (119) by including it in a field (e.g., ANI) of the ISDN call SETUP message (118). The gateway also interfaces the Internet connection with the telephone call. The call center uses the calling number to effect a screen pop at the agent position (109–110) of the agent assigned to handle the call.

15 Claims, 2 Drawing Sheets

OTHER PUBLICATIONS

M2 Communications, Multi Call: Web Call–A Real Virtual Call Center, M2 Presswire, Nov. 27, 1995, DialogWeb Command Mode, http://www.dialogweb.com/cgi/dwclient.

*Scopus's Call Center Web Stuff*, Computer Technology Demo Fall 1996, Orlando, FLA., vol. 4, Iss. 12, Oct. 30–Nov. 2, 1996, p. 64.

E. Margulies, IVR Meets the Internet, IVR Supplement, 1996, pp. 41–47.

Netspeak's Hot Internet Sun Product, Computer Telephony, Aug. 1996, vol. 5, Issue 8, pp. 120, 122–124.

Internet Hop Off, Computer Telephony, Mar. 1996, vol. 4, Issue 3, pp. 10,12.

E. Margulies, Vocaltec's Telephony Gateway—The Ultimate Internet Telephony Solution?Computer Technology, Sep. 1996, vol. 4, Iss. 9, pp. 30, 32, 34–35.

Z. Grigonis, Rockwell Teams with Dialogic to Build Groupware Servers for Small Centers,Computer Telephony, Apr. 1996, vol. 4, Iss. 4, p. 112.

P. Roberts, Dialogic and Vocaltec Open a Door to a World of Possibility, Computer Telephony, Apr. 1996, vol. 4, Iss. 4, p. 4.

R. Grigonis, Altigen's Mixed–Media Server Platform—Re–shapes Zippy's CT Vision, Computer Telephony, Apr. 1996, vol. 4, Iss. 4., p. 49.

Z. Grigonis, Genesys Labs' and Tandem Team for Red Hot Call–Center Solutions, Computer Telephony, Apr. 1996, vol. 4, Iss. 4, pp. 98–99.

* cited by examiner

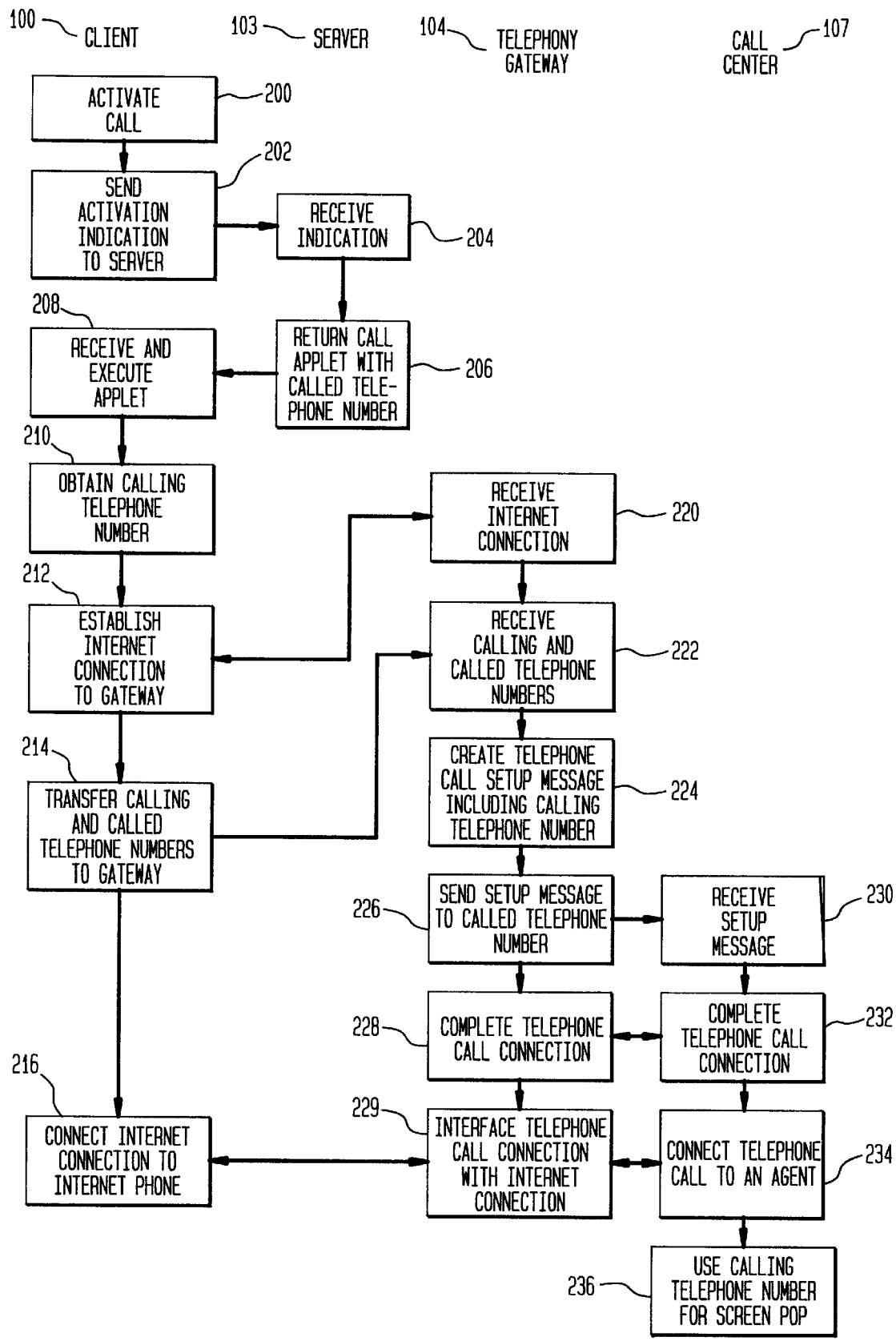

EXTENDING INTERNET CALLS TO A TELEPHONY CALL CENTER

TECHNICAL FIELD

This invention relates to communications networks and to call centers.

BACKGROUND OF THE INVENTION

Unlike circuit-switched communications networks, such as telephone networks, packet-switched communications networks, such as the Internet, are typically used to convey non-real-time information such as data, as opposed to real-time information such as voice calls. However, it is known in the art that voice communications can be carried by the Internet or other data networks and that these communications can be interfaced by a gateway to the telephone network so that a voice-enabled computer or an Internet phone connected to the Internet network can engage in a voice call with a standard telephone connected to the telephone network. An illustrative example of such a capability is disclosed in "Internet Hop Off", *Computer Telephony*, Vol. 4, Issue 3 (March 1996), pp. 10–11.

Telephony call centers are conventionally adapted to handle standard telephone calls. Advanced call centers often have a capability known as "screen pop", wherein the caller identification information, such as ANI (automatic number identification), which is supplied to the call center as a part of setting up the call to the call center, is used by the call center to retrieve data records pertaining to the calling party and display the records on the display screen of the terminal being used by the call-center agent who is assigned to handle the call, at the same time as the call is connected to that agent's telephone.

Recently, call centers have come into existence that are able to interact with users of the Internet. All such call centers are believed to use a "callback" feature in order to effect communications with the Internet user. They generally work as follows. An Internet user uses a browser on his or her Internet terminal to contact a World-Wide Web page of a call-center customer on a Web server, in a conventional manner. The page may have a virtual button or some other software-based indicator by means of which the user may indicate a desire to speak with a representative of the customer. If the user makes use of the indicator, the user is prompted to enter his or her telephone number. This number is conveyed to the server, which in turn sends it to the customer's call center. The call center uses the supplied telephone number to place a standard outbound call to the user's telephone, and also uses the telephone number to effect a "screen pop" when the called user answers. An illustrative example of such a call center is disclosed in "Rockwell Teams with Dialogic to Build Groupware Servers for Small Centers", *Computer Telephony*, Vol. 4, Issue 4 (April 1996), p. 112.

"Call back" call centers have disadvantages over call centers that handle inbound telephone calls, however. One disadvantage is that, after having indicated a desire to speak to a representative of the call center customer, the Internet user must wait for the callback. This delay may be annoying to the user. Moreover, the user may become unavailable during this wait, for example, due to receipt of an intervening phone call. But the principal disadvantage is that most Internet users—at least residential users—presently typically have only one telephone line available to each of them, and they use this telephone line for the Internet access. Thus, unless and until the Internet user ends his or her Internet session and frees up his or her telephone line, the call center cannot reach the user.

SUMMARY OF THE INVENTION

This invention is directed to solving these and other problems and disadvantages of the prior art. The inventors have realized that the problems associated with "call back" call centers can be avoided by not relying on call center "call back", and instead using the gateway (Internet-to-telephone call interface) capability mentioned previously to convert the user's Internet call to a telephone call and connect the telephone call to the call center as an inbound call.

This approach presents another difficulty, however. Because an Internet call does not originate in the telephone network, and the Internet does not use telephone numbers as network addresses, caller-identification information such as ANI is not available for a telephone call that has been converted from an Internet call. Hence, the call center which receives the converted call is unable to do "screen pops" for the caller until the call-center agent answers the call and interrogates the caller for his or her identity. This greatly lessens the efficiency of call center operations.

The inventors have come up with a solution to this problem as well. According to the invention, the gateway that converts the Internet call to a telephone call obtains the user's identification, such as his or her telephone number, from the user via the Internet, converts the obtained information into caller identification information, such as ANI, and provides this information to the call center along with the converted call in the conventional manner, such as by including it in the call set-up message of the incoming call to the call center. Consequently, the call center is able to function in its conventional manner and without any modification or loss of functionality, even though the calling party is not a telephone caller but an Internet caller.

These and other advantages and features of the invention will become more apparent from a description of an illustrative embodiment of the invention taken together with the drawing.

BRIEF DESCRIPTION OF THE DRAWING

FIG. 2 is a block diagram of operations of units of the communications network of FIG. 1 that implement the illustrative embodiment of the invention.

DETAILED DESCRIPTION

Figure 1:
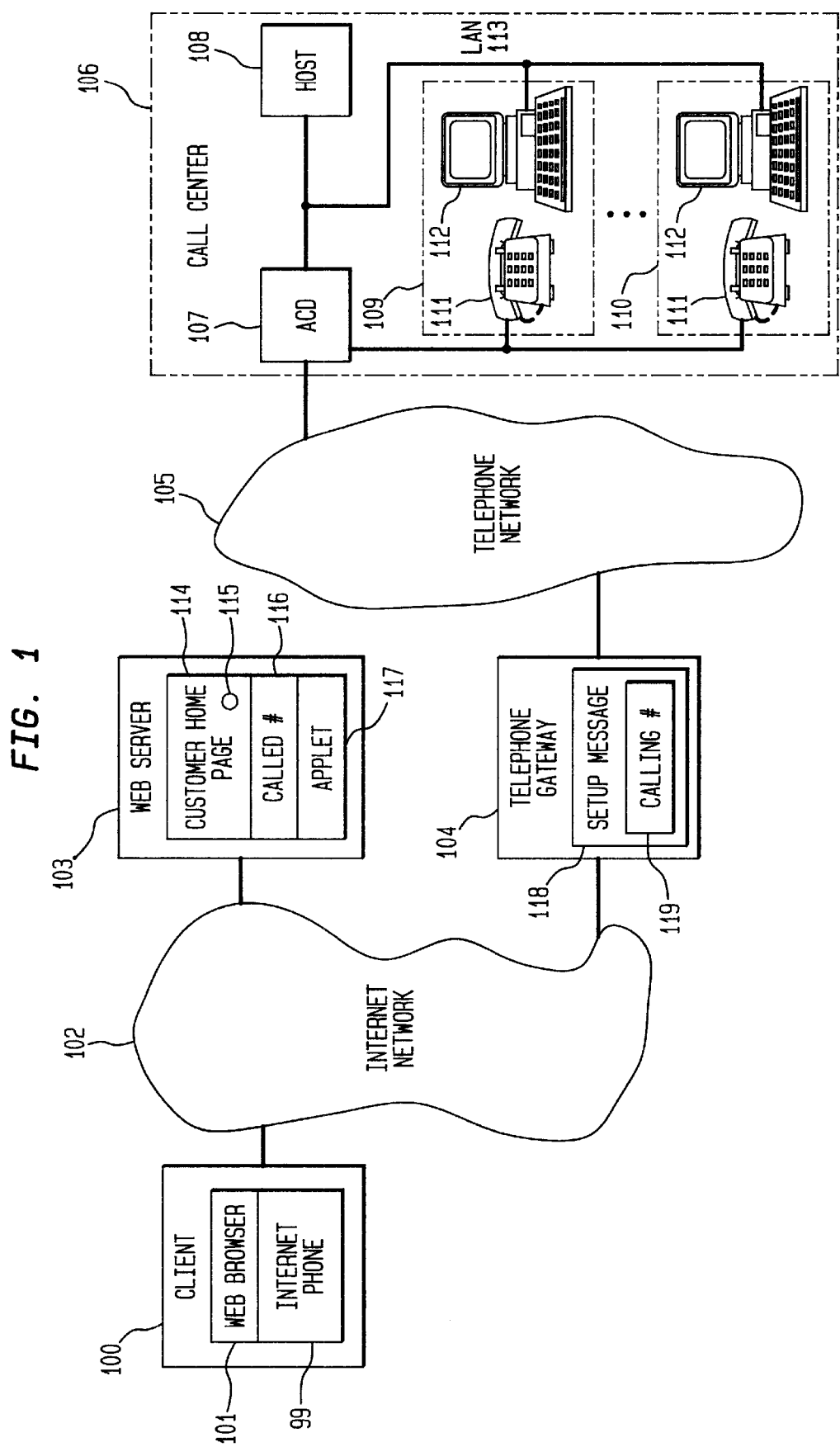
FIG. 1 is a block diagram of a communications network that implements an illustrative embodiment of the invention.

FIG. 1 shows a combined data-and-telephony communications network. The data portion of the network comprises at least one client machine, such as a personal computer, referred to as a client 100, interconnected with at least one World Wide Web server machine, such as a computer, referred to as a Web server 103, by the Internet data communications network, referred to as the Internet 102. Client 100 is equipped with an Internet phone 99 and also executes a World Wide Web browser program, referred to as a Web browser 101. The telephony portion of the communications network of FIG. 1 comprises the public telephone system 105, and a conventional call center 106 connected to telephone system 105.

Call center 106 conventionally includes an automatic call distributor (ACD) 107 and a host computer 108 connected to and serving a plurality of call center agent positions 109–110. Each agent position 109–110 includes a telephone 111 connected to ACD 107 for receiving voice calls, and a data terminal 112 connected by a local area network (LAN) 113 to host computer 108 for receiving data such as calling customers' records. Alternatively, the telephone and data terminal are combined into a single instrument, such as a display telephone or a personal computer equipped with a "soft phone". ACD 107 and host computer 108 are interconnected by LAN 113 so that host computer 108 can receive information from ACD 107 on which voice calls are being connected to which agent positions 109–110, so that host computer 108 can perform "screen pops" on displays of data terminals 112, in a conventional manner.

Telephone system 105 and Internet 102 are interconnected by a telephony gateway 104 which converts Internet voice calls to telephone calls and vice versa. Telephone gateway 104 is illustratively the Lucent Technologies Inc. MMCX, or a modified version of the Lucent Technologies Inc. Definity® private branch exchange.

Web server 103 includes a Web home page 114 for a client of call center 106, which may be accessed by a user of client 100 via Web browser 101 over Internet 102, in a conventional manner. Home page 114 has a conventional hypertext markup language (HTML) capability—such as a "call" virtual button 115—by means of which user of Web browser 101 can indicate a desire to speak to an agent of call center 106.

As described so far, the communications system of FIG. 1 is conventional.

According to the invention, the client user's activation (selection) of the "call" virtual button 115 causes an inbound call to be set up from Internet phone 99 through gateway 104 to call center 106, in the manner shown in FIG. 2. When the user selects the "call" virtual button 115 of Web page 114 via Web browser 101 on client 100, at step 200, the HTML capability sends a "call" activation indication to Web server 103 via Internet 102, at step 202, in a conventional manner. Server 103 receives the indication, at step 204, and responds by returning an "applet" 117 to browser 101 of client 100 via Internet 102, at step 206, again in a conventional manner. Applet 117 is a helper application, such as a Java application program, or a Multipurpose Internet Mail Extensions (MIME) file that activates an application program included in browser 101. Applet 117 includes the telephone number (or some other identifier) 116 of call center 106 as the called telephone number. Receipt of applet 117 at client 100 triggers its (or its corresponding application program's) execution within browser 101 on client 100, at step 208. Executing applet 117 obtains an identifier of the user of client 100 (such as the user's name, or Internet "handle", but preferably the user's telephone number), at step 210, illustratively by prompting the user to enter his or her identifier on client 100. Executing applet 117 then causes client 100 to establish an Internet connection from client 100 through Internet network 102 to telephone gateway 104, at step 212, and transfers the telephone numbers or other identifiers of the user (calling number) and of the call center (called number) to gateway 104 over this Internet connection, at step 214. Executing applet 117 also causes client 100 to connect the Internet connection to Internet phone 99, at step 216. Telephone gateway 104 receives the Internet connection from client 100 through Internet 102, at step 220, and receives the calling and called telephone numbers or other identifiers over this connection, at step 222.

According to an alternative implementation of the invention, home page 114 further includes a fill-in-the-blank form. In response to the client user's activation of the "call" button, the form is displayed to the user and the user is prompted to fill in his or her identifier and any other information that may be desired (e.g., whether the user is an account holder, and if so, what is the user's account number). After the user fills in the form, client 100 returns the filled-in form to server 103, which stores it in association with information that identifies client 100 as the caller and call center 106 as the call destination. Client 100 then further responds to the activation of the "call" button by establishing an Internet connection from client 100 through Internet network 102 to telephone gateway 104, and connecting the Internet connection to Internet phone 99. Telephone gateway 104 receives the Internet connection from client 100 through Internet 102, and in response queries server 103 for the previously-saved contents of the filled-in form and the call destination that are associated with calling client 100.

If one or both of the caller and call destination identifiers received by telephone gateway 104 are not telephone numbers, gateway 104 has them translated into corresponding telephone numbers, in a conventional manner. Telephone gateway 104 then creates a telephone call setup message 118 and includes the calling telephone number 119 in setup message 118, at step 224. Illustratively, telephone gateway 104 creates a conventional ISDN call SETUP message and includes the calling telephone number in the ANI, UUI, II digits, or some other predetermined field of the ISDN call SETUP message. Telephone gateway 104 then sends setup message 118 through telephone system 105 to the called number, i.e., to call center 106, at step 226.

Call center 106 receives the telephone call setup message 118, at step 230, and responds by interacting with telephone gateway 104 in a conventional manner, at step 232, to complete a telephone connection between call center 106 and telephone gateway 104 through telephone system 105.

Telephone gateway 104 also interacts conventionally with call center 106 to complete the telephone connection between them, at step 228, and then interfaces the telephone connection with the Internet connection, at step 229, thereby enabling the user of Internet phone 99 to speak with an agent at a telephone 111.

ACD 107 of call center 106 connects the telephone call to a telephone 111 of one of the agent positions 109–110, at step 234, in a conventional manner. ACD 107 also sends the calling number 119 from the call setup message 118 to host 108, which uses it to perform a screen pop at the data terminal 112 of the one agent position 109–110, at step 236, again in a conventional manner. Consequently, from the perspective of call center 106, the incoming call is no different than if it had been made from a telephone of telephone system 105.

Of course, various changes and modifications to the illustrative embodiment described above may be envisioned. For example, in addition to using information gathered from user to populate the call SETUP message, the gateway can use the information to select the telephone number of the call center to which the call is placed. Such changes and modifications can be made without departing from the spirit and the scope of the invention and without diminishing its attendant advantages. It is therefore intended that such changes and modifications be covered by the following claims.

The invention claimed is:

1. A method of effecting a call-center call in a communications system that includes a client-server network comprising at least one client and at least one server interconnected by a data network, a telephone network, a telephone call center connected to the telephone network, and a gateway interfacing the data network with the telephone network, the method comprising the steps of:

the client indicating to the server through the data network a desire to speak to a call center agent;

in response to the indication, the server providing to the client through the data network information enabling the client to connect to the call center, including an identifier of the call center;

in response to receipt of the information, the client establishing a connection through the data network to the gateway and providing the call center identifier to the gateway via the connection; and in response to the receipt of call center identifier, the gateway establishing a telephone call through the telephone network to the call center and interfacing the telephone call to the connection.

2. The method of claim 1 wherein:

the identifier of the call center comprises a telephone number of the call center.

3. The method of claim 1 wherein:

the information comprises an executable application; and the step of the client establishing and providing comprises the step of the client establishing the connection to the gateway and providing the call center identifier to the gateway by executing the application.

4. The method of claim 1 in a communications system wherein the client includes a data phone, and wherein:

the step of the client establishing a connection comprises the step of the client establishing said connection through the data network between the data phone and the gateway.

5. The method of claim 1 in a communications network wherein the data network comprises a packet-switched network.

6. The method of claim 1 in a communications network wherein the data network comprises the Internet.

7. The method of claim 1 wherein:

the step of the client establishing and providing comprises the step of the client further providing an identifier of a user of the client to the gateway via the connection; and the step of the gateway establishing a telephone call comprises the step of in response to receipt of the identifier of the client, the gateway conveying the identifier of the client to the call center.

8. The method of claim 1 wherein:

the step of the client establishing and providing comprises the step of the client further providing a telephone number of a user of the client to the gateway via the connection; and the step of the gateway establishing a telephone call comprises the step of in response to receipt of the telephone number of the client, the gateway conveying the telephone number of the client as a calling telephone number to the call center.

9. The method of claim 8 further comprising the step of:

in response to the establishment of the telephone call, the call center using the calling telephone number to effect a screen pop at an agent position that is handling the telephone call.

10. A method of effecting a call-center call in a communications system that includes a client-server network comprising an Internet client equipped with a World Wide Web (WWW) browser and an Internet phone, at least one Internet server for serving at least one WWW page, and an Internet network interconnecting the client with the server, and that further includes a telephone network, a telephone call center connected to the telephone network, and a gateway interfacing the Internet network with the telephone network, the method comprising the steps of:

a user of the client interacting via the browser with a WWW page provided through the Internet to the client by the server, to indicate a desire to speak to a call center agent;

in response to the interacting, the client notifying the server through the Internet of the user's desire;

in response to the notification, the server providing to the client through the Internet an executable application and a telephone number of the call center;

in response to receipt of the executable application and the telephone number, the client executing the application;

in response to executing the application, the client obtaining a telephone number of the user, establishing a connection through the Internet between the Internet phone and the gateway, and providing the telephone number of the user and the telephone number of the call center to the gateway via the connection;

in response to the connection and the telephone numbers, the gateway establishing a telephone call through the telephone network to the call center, using the telephone number of the user as the calling number and using the telephone number of the call center as the called number, and further interfacing the established telephone call with the established connection through the Internet; and in response to establishment of the telephone call, the call center connecting the telephone call to an agent position and using the calling telephone number to effect a screen pop at the agent position.

11. The method of claim 10 wherein:

the step of using the telephone number of the user as the calling number comprises the step of the gateway including the telephone number of the user as the calling number in a call setup message to the call center for establishing the telephone call.

12. A client for a client-server network that comprises the client, at least one server, and a gateway to a telephone system, interconnected by a data network, the client comprising:

an arrangement for indicating to the server through the data network a desire to speak to a call center agent; and an arrangement responsive to receipt from the server through the data network of information enabling the client to connect to a call center through the gateway, including an identifier of the call center, for using the information to establish a connection through the data network to the gateway and providing the call center identifier to the gateway through the connection for use by the gateway in establishing a telephone call to the call center.

13. The client of claim 12 wherein:

the arrangement for using and providing further uses the information to obtain an identifier of a user of the client and further provides the identifier of the user to the gateway through the connection for use by the gateway in establishing the telephone call.

14. The client of claim 13 wherein:

the identifier of the user is a telephone number of the user, and the arrangement for using and providing provides the telephone number of the user to the gateway as the calling telephone number.

15. The client of claim 12 wherein:

the information comprises an executable application, the identifier of the call center comprises a telephone number of the call center, and the arrangement for using and providing comprises means for executing the application to obtain a telephone number of a user of the client, establish a connection from the client through the data network to the gateway, and provide the telephone number of the call center as the called telephone number and further provide the telephone number the user as the calling telephone number, to the gateway through the connection for use by the gateway in establishing a telephone call to the call center.

* * * * *